United States Patent

[11] 3,600,816

| [72] | Inventor | Takashi Watanabe |
| | | Nagoya-shi, Japan |
| [21] | Appl. No. | 809,281 |
| [22] | Filed | Mar. 21, 1969 |
| [45] | Patented | Aug. 24, 1971 |
| [73] | Assignee | Kabushiki Kaisha Towa Denki |
| | | Aichi-ken, Japan |
| [32] | Priority | Apr. 5, 1968, Apr. 5, 1968, Apr. 5, 1968, and July 30, 1968 |
| [33] | | Japan |
| [31] | | 43/22,042, 43/26,699, 43/26,698 and 43/53,369 |

[54] ROTARY CUTTER BLADE-ADJUSTING APPARATUS
5 Claims, 15 Drawing Figs.

[52] U.S. Cl. .................... 33/185,
29/96, 83/674, 83/677, 83/700
[51] Int. Cl. .................... B27g 23/00
[50] Field of Search .................... 33/185;
83/677, 674, 699, 698, 700; 29/96

[56] References Cited
UNITED STATES PATENTS

| 780,512 | 1/1905 | Lewis | 33/185 |
| 875,479 | 12/1907 | West | 33/185 |
| 1,641,114 | 8/1927 | Carlson | 33/185 |
| 2,034,161 | 3/1936 | Thiel | 83/674 |
| 2,158,313 | 5/1939 | VonHofe | 33/185 |
| 2,775,821 | 1/1957 | Eipper et al. | 33/185 |
| 3,252,202 | 5/1966 | Bullard et al. | 33/185 X |
| 3,280,468 | 10/1966 | Rangus | 33/185 |

Primary Examiner—Frank T. Yost
Attorney—Steinberg & Blake

ABSTRACT: Apparatus for adjusting a blade of a rotary cutter. The blade is removable from the body of the cutter when an edge of the blade is sharpened. A positioning member is adjustably connected with the blade member, and a gauge is provided for adjusting the positions of the blade member and positioning member one with respect to the other while they are still separate from the cutter body so that the relative positions of the blade and positioning members will situate the cutting edge of the blade at the proper location with respect to the positioning member. The cutter body has a locating part which locates the positioning member at a predetermined location on the cutter body, so that in this way when the parts are reassembled with the positioning member situated at this predetermined location, the blade will automatically assume its proper cutting position at the cutter body.

PATENTED AUG 24 1971 3,600,816

INVENTOR
TAKASHI WATANABE

BY
Steinberg & Blake
ATTORNEYS

INVENTOR
TAKASHI WATANABE

INVENTOR
TAKASHI WATANABE

INVENTOR
TAKASHI WATANABE

ROTARY CUTTER BLADE-ADJUSTING APPARATUS

BACKGROUND OF THE INVENTION

The present invention relates to rotary cutters.

Thus, the present invention relates for example, to rotary cutters which are driven by electric motors or the like so that work placed in engagement with the rotary cutters can be cut thereby.

The present invention relates in particular to that type of rotary cutter which has one or more cutting blades which can be removed from a rotary body of the cutter, which carries these blades. Such removal of a blade from the rotary cutter body is required when the cutting edge of the blade becomes too dull to continue the cutting operations in the most efficient manner. Thus, with every cutter of this general type, after a certain period of use, it becomes necessary to remove the cutting blades, sharpen the cutting edges thereof, and then reassemble the cutting blades with the rotary cutter body which carries these blades during the operations.

As is well known, with rotary cutters of this latter general type the cutting edges of the blades are required to project through a given distance outwardly beyond the exterior periphery of the rotary cutter body so that the cutting edges will be exposed and will project beyond the rotary cutter body through a distance which is sufficient to enable the cutting operations to be carried out. This distance by which the cutting edge of the blade projects beyond the rotary cutter body is a critical feature of the assembly. If the blade projects at its cutting edge through too great of a distance beyond the rotary cutter body then the blade will cut too deeply into the work resulting in undesirable tearing, rather than cutting, of certain work materials and also resulting very often in an insecure mounting of the cutter blade with corresponding undesired vibrations of the cutter blade resulting in chattering and nonsmooth cuts. On the other hand, if the cutting blade does not project at its cutting edge through an adequate distance beyond the exterior surface of the rotary cutter body, then insufficient cutting will take place at each engagement of the cutter blade with the work, resulting also in undesirable inefficiencies.

It is therefore apparent that it is extremely important to properly position the cutter blade on the rotary cutter body which carries the cutter blade. With conventional rotary cutters of this general type, whenever the cutter blade has been removed to be sharpened and is then replaced, it is necessary to carry out very carefully a precise adjustment so as to situate the cutting edge properly with respect to the rotary cutting body. Such proper adjustment of the blade each time it is reassembled with the body after being sharpened is exceedingly time consuming and in most cases will not be carried out in the best possible manner except by the most skilled operators.

SUMMARY OF THE INVENTION

It is accordingly a primary object of the present invention to provide apparatus which will avoid the above drawbacks.

In particular, it is an object of the present invention to provide apparatus which make it possible for even unskilled operators to determine in a precise and fully reliable manner the position which the cutting blade will have after it is sharpened and reassembled with the rotary cutter body, with this position the cutting blade being the best possible position for the cutting blade, corresponding to that which would be provided by even the most skilled and experienced of operators.

In addition it is an object of the invention to provide apparatus which will enable the adjusting manipulations to take place before the blade is reassembled with the rotary cutter body, so that the inconveniences involved in carrying out adjustments directly at the cutter body itself can be eliminated.

It is furthermore an object of the invention to provide for the accomplishment of the above objects a structure which is exceedingly simple as well as reliable and easy to operate.

According to the invention the rotary cutter includes a blade member and a positioning member which are adjustably connected to each other. This positioning member has a precisely determined location at the rotary cutter body. After a blade has been sharpened, its position with respect to the positioning member is adjusted prior to reassembly of the blade member and positioning member with the rotary cutter body. This adjustment of the blade member and positioning member with respect to each other can be carried out in an exceedingly simple, highly efficient and highly precise manner through the use, for example, of a suitable gauge before the blade member and positioning member are reassembled with the rotary cutter body. Then, after this adjustment has been carried out, the adjustable interconnected blade member and positioning member are reassembled with the rotary cutter body, the positioning member taking its precisely determined position at the rotary cutter body, so that with the positioning member at this latter position the blade member will have its cutting edge properly situated with respect to the rotary cutter body.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
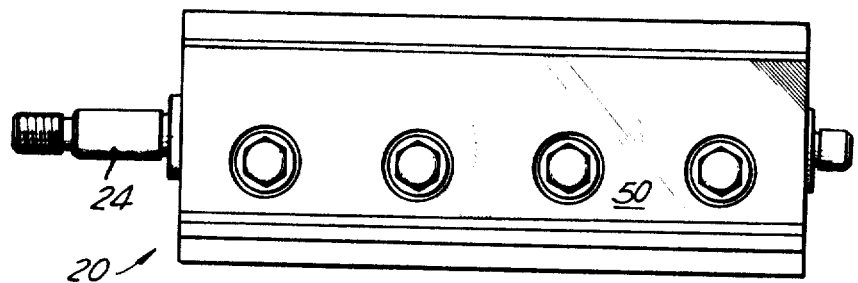
FIG. 1 is a top plan view of a rotary cutter of the invention.
Figure 2:
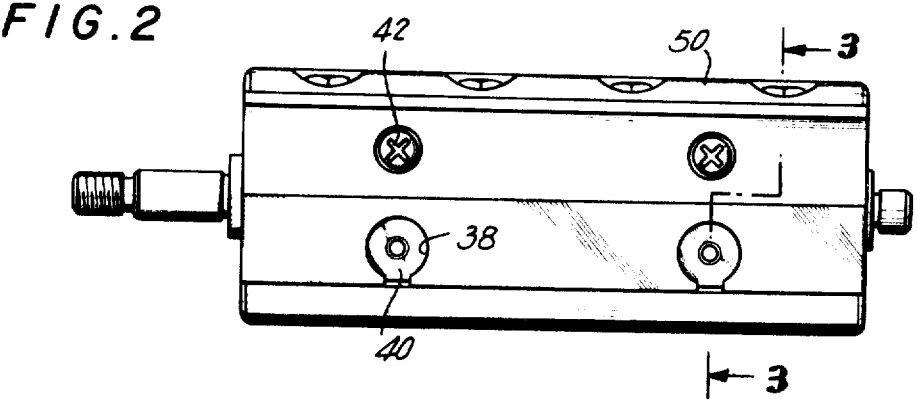
FIG. 2 is a front elevation of the cutter of FIG. 1.
Figure 3:
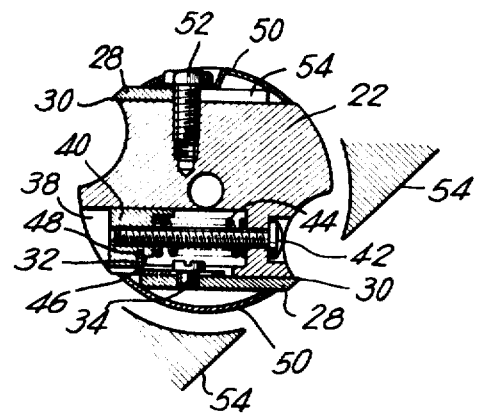
FIG. 3 is a transverse section of the cutter of FIG. 2, taken along line 3—3 of FIG. 2 in the direction of the arrows, FIG. 3 additionally illustrating, fragmentarily and schematically, the structure which guides the work.

Referring now to FIGS. 1-3, the rotary cutter 20 of the invention which is illustrated therein includes a rotary cutter body 22 which is rotated about its axis, during operation of the cutter 20, by way of any suitable drive transmitted to the shaft extension 24 which is fixed to and projects axially from the body 22. The body 22 has a pair of opposed flats 26 one of which is visible in FIG. 4. A pair of blade members 28 are respectively situated against these flats 26 in the assembled condition illustrated in FIG. 3.

The blades 28 are respectively provided with cutting edges 30 which are required to project through a given distance beyond the exterior periphery of the body 22, in the manner shown most clearly in FIG. 3. Each blade member 28 is assembled with a pair of positioning members 32 (FIG. 6) adjustably fixed to the blade member 28 by way of an adjusting means which includes the fastening screws 34 and portions of the positioning members 32 which are formed with slots 36. Thus, as is apparent from the lower portion of FIG. 3, it is possible for the screw 34 to be loosened so that the relative position between the blade member 28 and the positioning member 32 can be adjusted by displacement of the slot 36 along the screw 34 after which the latter may be tightened to maintain the blade member 28 and positioning members 32 in their adjusted positions.

The body 22 has for each blade member 28 a pair of elongated transversely extending guide bores 38 of keyhole configuration, as is most clearly apparent from FIG. 2. The pair of guide bores 38 are situated between each blade member 28 and the axis of the body 22. A locating block 40 is axially slidable along each guide bore 38 in the interior thereof with each block 40 having a cross section matching that of the bore 38 so that while each block 40 can shift axially along the bore 38 it cannot turn therein. Adjusting screws 42 are rotatably carried by the body 22 which prevents them from moving axially, as is apparent from FIG. 3, and these screws 42 respectively extend into threaded bores of the blocks 40 so that by turning the screws 42 the location of the blocks 40 can be determined. Springs 44 respectively surround the threaded shanks of the screws 42, pressing at one end against a block 40 and at its opposite end against the closed end of the bore 38, so that these springs serve to reliably maintain the locating blocks 40 at the adjusted positions determined by the screws 42.

The structure described above is repeated on both sides of the axis of the body 22 with the structure on one side of this axis being oriented oppositely to the structure on the other side, as is apparent from FIGS. 2 and 3.

In order to carry out their locating functions, the blocks 40 are respectively formed with grooves 46 which extend parallel to the axis of the body 22. The positioning members 32 are in the form of L-shaped strips respectively having end legs 48 directed away from the blade members 28 and extending into the bores 38 to be received in grooves 46. Thus, the location of the grooves 46 will determine the position of the blade member 28, which is adjustably fixed to the positioning members 32, in the rotary cutter.

An outer clamping strap 50 of channel-shaped configuration engages the exterior surface of each blade member 28 and a part of the flat 26 which is not covered by the blades 28, and through openings of the strap 50 a plurality of fixing bolts 52 extend into threaded bores which are formed in the body 22. Each strap 50 is provided with indentations for accommodating the heads of the bolt 52.

The assembled cutter of FIG. 3 rotates in a counterclockwise direction, as viewed in FIG. 3, when carrying out the cutting operations. The work is guided by surfaces 54 of any suitable frame structure in which the cutter is accommodated.

Figure 4:
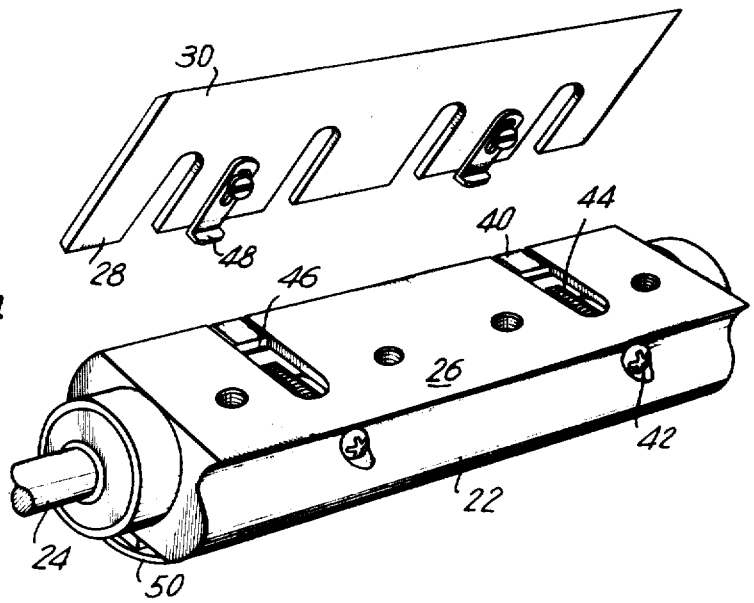
FIG. 4 is an exploded perspective illustration of the manner in which the blade and positioning members are assembled with the rotary cutter body.
Figure 5:
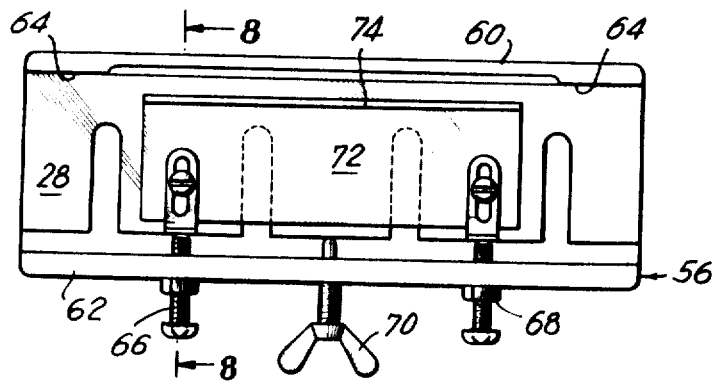
FIG. 5 is a top plan view showing the blade and positioning members with an adjusting gauge structure of the invention.
Figure 6:
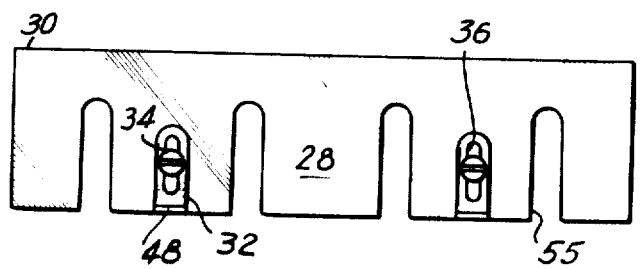
FIG. 6 is a top plan view of the blade and positioning members.

After the cutter described above has been used to such an extent that the cutting edges 30 must be sharpened, the blade and positioning members are disassembled from the rotary cutter so that the blade members can be sharpened at their edges 30. For this purpose the bolts 52 are removed so that the clamping straps 50 can be removed, and then each blade 28 and the positioning members 32 carried thereby can be disassembled simply by displacing the portions 48 of members 32 out of the grooves 46 and displacing the assembly of each blade member 28 and positioning members 32 away from the body 22 in the manner shown most clearly in FIG. 4. As is shown in FIGS. 4 and 6 the blade member 28 is provided with the elongated transverse slots 55 respectively having open ends, so that the blade member 28 will clear the shanks of the bolts 52.

With each blade member 28 thus removed from the assembly, it is possible for the cutting edge 30 thereof to be sharpened in a conventional manner. After the blade member 28 has been sharpened, its position with respect to the positioning members 32 is adjusted so that the blade member will have the proper position with respect to the body 22 when reassembled therewith.

Figure 7:
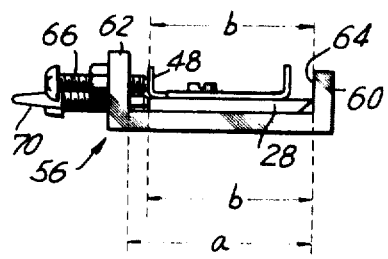
FIG. 7 is an end elevation of the structure of FIG. 5 as seen from the right of FIG. 5.
Figure 8:
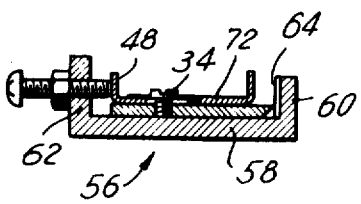
FIG. 8 is a transverse section of the structure of FIG. 5 taken along line 8—8 of FIG. 5 in the direction of the arrows.

These latter results are achieved with the following method and structure The sharpened blade member 28 and positioning members 32 connected to the blade member by the screws 34 are placed within a gauge 56. This gauge 56 is of the generally U-shaped cross section apparent from FIG. 8. Thus, the gauge has a bottom wall 58, a front upstanding flange 60, and a rear upstanding flange 62. The front upstanding flange 60 has an inner edge-engaging surface 64 which is directly engaged by the cutting edge 30 of the sharpened blade member 28. The rear upstanding flange 62 is provided with threaded bores which respectively receive adjustable locating screws 66 which after adjustment are held in their adjusted positions by way of locknuts 68. Also, the this rear flange 62 is formed with a threaded bore which receives the manually turnable wing screws 70. As may be seen from FIG. 7, while the inner surfaces of the flanges 60 and 62 are capable of providing a maximum distance a therebetween, the locating screws 66 at their inner free ends will respectively engage the projecting legs 48 of the L-shaped positioning members 32 so as to determine the distance between the edge 30 or surface 64 and that end face of leg 48 which is directed away from the edge 30. It is this end face of the leg 48 of each positioning member 32 which engages that side surface of the groove 46 of each block 40 which is most distant from the edge 30 in the assembled cutter. Therefore, by proper adjustment of the screws 66 it is possible to determine the proper distance between the newly sharpened edge 30 and the end surface of leg 48 directed away from the newly sharpened edge 30.

In order to achieve this adjustment the screws 34 are loosened. The blade member 28 while resting on the wall 58 of the gauge 56 has its cutting edge 30 held in engagement with the locating edge-engaging surface 64 by the wing screw 70 which is turned so that its inner free end will engage the rear edge of the blade 28 which is directed away from its edge 30. With the screws 34 still in their loosened condition, a manually engageable adjusting tool 72 is placed on top of the blade member 28. This tool 72 has along one edge an upstanding flange. At its opposite edge it is formed with inwardly extending notches which receive and match the configuration of the peripheries of the legs of positioning members 32 which engage the blade member 28. Thus, with the latter legs of positioning members 32 received in these notches of the handtool 72, the latter is pressed toward the flange 62 so as to locate the projecting legs 48 in abutment with the free ends of the locating screws 66. With the parts held in this position the operator will now tighten the screws 34. Thereafter, the handtool 72 is removed, and the wing screw 70 is backed away from the blade 28. Now the blade member 28 with the adjusted positioning members 32 adjustably fixed thereto can be removed from the gauge 56 and reassembled with the cutter body 22. For this purpose it is only necessary to situate the projections 48 within the grooves 46 of the blocks 40, after which the clamping straps 50 are situated on the blades and the fastening bolts 52 are threaded into the body 22 so as to reassemble the parts.

Thus, no adjustment of the blade 28 at the body 22 is required. When the new cutter 20 has its parts assembled, at the plant where it is manufactured, for example, the location of the locating means or blocks 40 with respect to the cutter 22 is initially adjusted by way of the screws 42, and these blocks 40 will thereafter remain in their adjusted positions.

This adjustment is such that the cutting edges 30 are initially located, in the new cutter with new blades 28, at the proper location with respect to the body 22. When the new cutter is received, before it is used the blade member 28 and positioning members 32 therewith are removed and placed on the gauge 56, and now the locating screws 66 are carefully adjusted so as to have their inner ends engaging the projecting legs 48 of the positioning members 32 of the new and as yet unused construction. With the locating screws 66 thus adjusted, the locknuts 68 are tightened so as to maintain the screws 66 in their adjusted positions. These are the only operations required with respect to positioning of the locating means 40 and the positioning-member-engaging means 66 of the adjusting means 56. Once these adjustments are initially made for the new blade and positioning members, these adjustments are maintained throughout the successive sharpening of each blade member 28.

After each sharpening the above-described adjusting operations are carried out, in accordance with the method of the invention, so that the positioning members 32 will be readjusted with respect to the newly sharpened blade member 28 to have with respect thereto a location which will properly situate the blade 30 with respect to the body 22 when the positioning members 32 are again assembled with the blocks 40.

Thus, with this adjusting method and apparatus of the invention the locating screws 66 will initially be adjusted so as to have, for example, a distance $b$ from their ends to the surface 64, with this distance corresponding to the distance between the surface of the groove 46 most distant from the cutting edge 30 and this cutting edge when the blade member 28 is properly assembled with the body 22.

Figure 9:
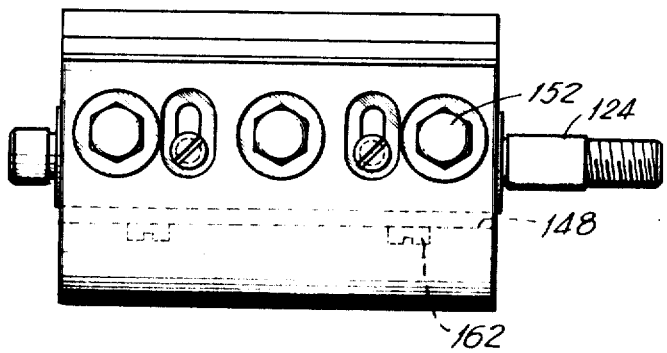
FIG. 9 is an elevation of another embodiment of a rotary cutter of the invention.
Figure 10:
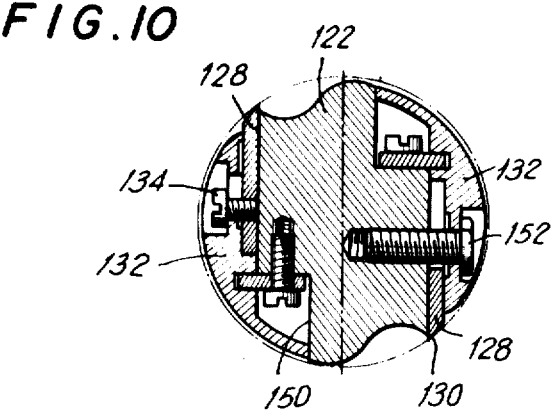
FIG. 10 is a transverse sectional elevation of the embodiment of FIG. 9 with different parts of FIG. 10 taken in different transverse planes for illustrating the details of the structure in the clearest possible manner.
Figure 11:
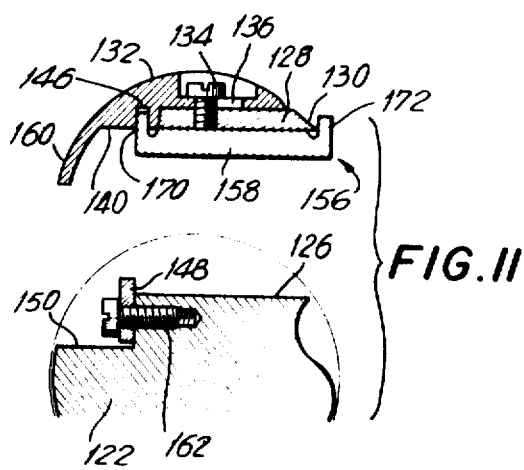
FIG. 11 is an exploded fragmentary sectional illustration of how the cutter components are assembled and disassembled, FIG. 11 also illustrating how an adjustment is carried out according to the invention.
Figure 12:
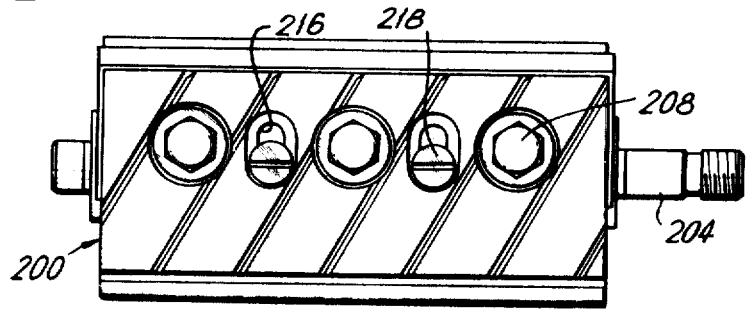
FIG. 12 is an elevation of yet another embodiment of a rotary cutter of the invention.

Referring now to FIGS. 9–11, the embodiment of the invention which is illustrated therein will accomplish the same results as the above-described method and apparatus, although with a structure which is simpler than that of FIGS. 1–8.

Referring to FIGS. 9–11, in this case also the rotary cutter body 122 will be driven by way of a shaft 124. This body 122 has opposed flats 126 against which the blade members 128 are situated. These blade members 128 respectively have the cutting edges 130 which must be properly positioned with respect to the body 122 in the manner shown most clearly in FIG. 10.

Each blade member 128 is releasably fixed with a positioning member 132 by way of a pair of screws 134. These screws are received in threaded bores of the blade members 128, in the manner shown most clearly in FIGS. 10 and 11. With the embodiment of FIG. 9–11, however, instead of a pair of positioning members for each blade member, there is only a single elongated positioning member 132 extending along the entire length of each blade member and also functioning as a fastening strap by means of which the blade and positioning member are fixed to the body 122. As is apparent from the right portion of FIG. 10 and from FIG. 9 the positioning member 132 is formed with recesses for receiving heads of fastening bolts 152 as well as the heads of the adjusting screws 134, and these bolts 152 extend through openings of the positioning member 132 and through clearing slots or notches formed in each blade member 128 into threaded bores of the body 122, releasably fixing the positioning member 132 and blade 128 to the body 122.

The positioning member 132 and the cutter body member 122 respectively have surfaces engaging each other with one of the surfaces provided with groove and the other having a projection received in this groove for determining the location of the positioning member 132 with respect to the cutter body 122. In the example of FIGS. 9–11, it is the positioning 132 which is formed at its surface 140 with an elongated groove 146 extending parallel to the axis of the cutter. The body 122 has a locating part 148 which is received in the groove 146. For this purpose it will be noted that the body 122 has the stepped portion 150 covered by the elongated portion 160 of the positioning member 132 when the parts are assembled in the manner shown in FIGS. 9 and 10. A surface of the stepped portion 150 engages a surface of the locating part 148 which is fixed to the body 122 by a pair of screws 165. Thus, this locating part 148 is not adjustable with respect to the body 122 and remains fixed thereto at a predetermined location. Also, the groove 146 is not adjustable with respect to the positioning member 132. However, the shank of the screw 134 extends through an elongated slot 136 which is formed within the positioning member 132 for each of the screws 134, so that the latter may be loosened to enable the blade member 128 to be shifted with respect to the positioning member 132.

With this construction the bolts 152 are removed whenever it is necessary to sharpen a blade member 128. The simple removal of these bolts will enable the positioning member 132 and the blade member 128 fixed thereto by the screws 134 to be removed from the cutter assembly. Then the blade 128 is sharpened, and with the parts in the position shown at the upper portion of FIG. 11 the blade member 128 is placed against the upper surface of the lower wall 158 of the gauge member 156 which is also of a substantially U-shaped cross section in this embodiment. However, in this case the rear flange 170 of the gauge 156 is received directly in the groove 146 while, upon loosening of the screws 134 the cutting edge 130 can be placed in engagement with the inner surface of the front flange 172. In this simple way the gauge 156 of the adjusting structure of FIG. 11 will properly position the newly sharpened edge 130 with respect to the positioning member 132 prior to assembly of the newly sharpened blade member with the body 122. Thus, with the flange 170 in the groove 146 and the edge 130 engaging the flange 172 at its inner edge-engaging surface the screws 134 are tightened so as to fix the positioning member 132 and blade member 128 to each other in their properly adjusted positions. Now the gauge 156 is removed and the assembly of the positioning member 132 and blade member 128 is placed on the body 122 with the locating part 148 thereof received in the groove 146. The fastening screws 152 are replaced and now the cutter is ready for use. Thus, with this embodiment also it is exceedingly convenient to quickly and precisely adjust the newly sharpened blade before it is reassembled with the cutter so that through a simple reassembly operation the blade will automatically assume its proper position with respect to the cutter.

The embodiment of the invention which is illustrated in FIG. 12–15 is even simpler than the embodiment of FIGS. 9–11 while still achieving the outstanding results of the invention. Thus, with this embodiment the rotary cutter 200 also has a cutter body 202 fixed with a shaft structure 204 by means of which the cutter is rotated about its axis. In this case, also, a positioning member 206 functions as a fixing strap. For this purpose the positioning member 206 is formed with openings through which the shanks of fastening screws 208 extend, into threaded bores of elongated bars 210 situated in the hollow interior of the body 202, as is apparent from FIG. 13. The body 202 is formed with openings 212 (FIG. 15) through which the screws 208 extend into the threaded bores of each bar 210. In addition the body 202 is formed with the slots 214 which communicate with the hollow interior. The positioning members 206 are formed with exterior recesses for receiving the heads of the bolts 208 so that the latter do not project beyond the exterior surfaces of the positioning members 206.

Figure 13:
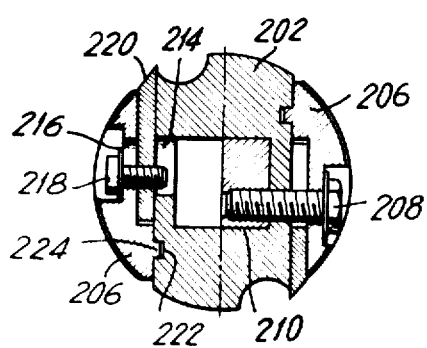
FIG. 13 is a transverse section of the structure of FIG. 12, different parts of FIG. 13 also being taken in different planes to show the details in the clearest possible manner.

The positioning members 206 are respectively formed with slots 216 through which fastening screws 218 extend into and through threaded bores of blade members 220, with the free ends of the screws 218 received in the slots 214 in the manner shown in FIG. 13. The screws 218 together with the blades 220 are capable of being adjusted along the slots 216 to determine the position of the blade members 220 and positioning members 206 with respect to each other.

With this embodiment the cutter body 202 and positioning members 206 also have surfaces which engage each other, and one of these surfaces is formed with a groove while the other surface has a locating projection received in the groove. However, with this embodiment it is the body 202 which is formed with a locating groove 222 for each positioning member 206, this groove 222 extending along the entire length of the body 202. Each positioning member 206 has a projecting rib 224 forming the locating part which is received in the positioning groove 222.

With this construction when a blade 220 has to be sharpened the bolts 208 are removed and the positioning member 206 together with the blade 220 are disassembled from the body 202. Now the cutting edge of the blade 220 is sharpened and before the parts are reassembled the newly sharpened blade 220 together with the positioning member 206 fastened thereto by the screws 218 are adjusted with the gauge 230 illustrated in FIG. 14. This gauge has a slot 232 corresponding to the slot 214 for receiving the free end of the screw 218. With the screws 218 loosened the cutting edge of the newly sharpened blade 220 is placed against the inner edge-engaging surface of a flange 234a, while the locating projection 224 of the positioning member 206 is received in a groove 236a formed in the gauge 230 and situated from the flange 234a by a distance which will determine the distance between the newly sharpened edge of the blade 220 and the locating rib 224. Thus, the distance between the flange 234a and the groove 236a corresponds to that distance between the cutting edge of blade 220 and the groove 222 which will properly locate the cutting edge with respect to the body 202. Therefore, with the newly sharpened cutting edge engaging the inner surface of flange 234a and the rib 224 in the groove 236a the screws 218 are tightened, and now the adjusted blade 220 and positioning member 206 are removed from the gauge 230 and reassembled with the body 202. This only requires the projecting rib 224 to be placed in the groove 222, whereupon the fastening bolts 208 can be replaced. At this time the blade 220 will rest on the flat 240 of the body 202.

Figure 14:
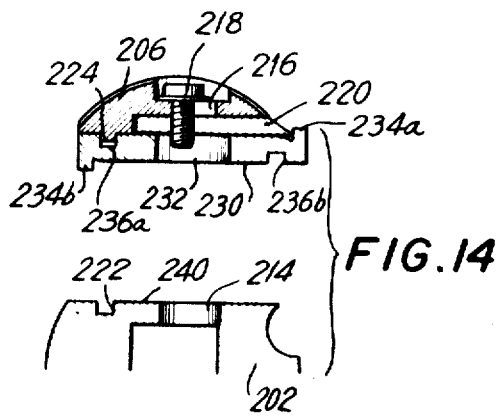
FIG. 14 is an exploded, fragmentary, sectional transverse elevation of the structure of FIG. 13 showing how the parts are assembled and disassembled; and also showing how adjustment of the blade is carried out in accordance with the invention.
Figure 15:
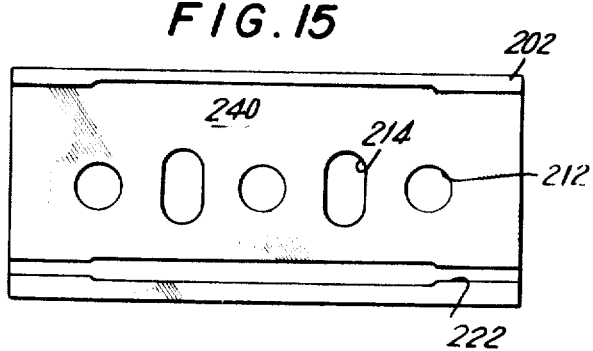
FIG. 15 is a top plan view of the rotary cutter body showing the flat thereof which receives the blade and positioning members.

It is to be noted that the gauge 230 as shown in FIG. 14 has opposed to the flange 234a an oppositely directed flange 234b. Also, it is formed with a positioning groove 236b oppositely directed with respect to the groove 236a. Therefore, with this gauge it is possible to apply the parts to the gauge either with the latter in the position of FIG. 14 or in an inverted position, so that the operator need not exercise any particular care with respect to which surface of the gauge is placed against the blade 220.

It will be seen, therefore, that while the embodiment of FIGS. 9-11 has a smaller number of components and is simpler than the embodiment of FIGS. 1-8, the embodiment of FIGS. 12-15 is even simpler in that it does not require any separate locating parts 148 and fastening screws 162 therefor. Furthermore, by reason of the communication between the slots 214 and the hollow interior of the body 202, it is unnecessary to use fastening screws 218 the ends of which will not project beyond that surface of the blade member which engages the flat of the cutter body.

It is apparent that with all of the embodiments of the invention it is possible for unskilled operators to very precisely determine the location of the cutting edge of the newly sharpened blade with manipulations carried out not at the cutter body but at a convenient location spaced therefrom and with the use of a gauge which will assure proper adjustment. With the apparatus of the invention once this latter adjustment is made it is only necessary to reassemble the blade and positioning members with the remainder of the cutter, and the blade will automatically have a properly adjusted position with respect to the rotary cutter body.

What is claimed is:

1. For use with an assembly which includes a rotary cutter blade member having a cutting edge, a positioning member engaging said blade member and having a predetermined position when affixed in a cutter, and adjustable connecting means releasably connecting said members to each other for adjustable movement one with respect to the other in a direction extending transversely of said cutting edge for releasably fixing said members to each other with said cutting edge at a location with respect to said positioning member which will provide for proper operation of the cutting edge when the blade member and positioning member are assembled with the remainder of the cutter with said positioning member situated at said predetermined position in the cutter: a gauge coacting with said members for determining the adjustment thereof with respect to each other, said gauge having an edge-engaging portion for engaging the cutting edge of said blade member and a positioning-member-engaging portion for engaging said positioning member, the latter engaging portion being situated from said edge-engaging portion by a distance which will determine the proper position of said members with respect to each other when said edge of said blade member engages said edge-engaging portion of said gauge and said positioning member engages said positioning-member-engaging portion of said gauge, said gauge having a flat surface for supporting said blade and a flange extending perpendicularly from said flat surface and having a side surface which forms said edge-engaging portion to engage the edge of said blade.

2. The combination of claim 1 and wherein said gauge has distant from said flange a second flange parallel thereto and threadedly carrying a positioning screw which forms the positioning-member-engaging portion of the gauge to engage the positioning member, whereby by the adjustment of said screw the gauge-determined location of the positioning member can be regulated.

3. The combination of claim 1 and wherein said gauge has a surface engaging a surface of said positioning member, one of said surfaces being formed with a recess and the other of said surfaces having a projection received in said recess for determining the location of said positioning member with respect to said gauge.

4. The combination of claim 3 and wherein said gauge surface is formed with said recess while said positioning member has a projection received in said recess.

5. The combination of claim 3 and wherein said surface of said positioning member is formed with said recess while said gauge has a projection received in said recess.